United States Patent

[11] 3,631,658

[72] Inventor Burton M. Green
     823 Riverside Drive, Ormond Beach, Fla. 32074
[21] Appl. No. 111,818
[22] Filed Feb. 2, 1971
[45] Patented Jan. 4, 1972

[54] DOUBLE DISC CLIPPER
     4 Claims, 3 Drawing Figs.
[52] U.S. Cl....................................... 56/11.3, 56/246, 56/293
[51] Int. Cl........................................A01d 35/26, A01d 55/00
[50] Field of Search............................. 56/293, 246, 247, 248, 155, 11.3, 11.6; 30/265; 172/15–18

[56] References Cited
     UNITED STATES PATENTS
     2,486,640  11/1949  Garwood.................... 56/256
     2,525,944  10/1950  Ralston...................... 56/25.4
     2,598,091  5/1952   Ahlgrim..................... 56/29.5
     2,812,631  11/1957  Koch.......................... 56/246
     3,472,007  10/1969  Green........................ 56/11.3

Primary Examiner—Russell R. Kinsey
Attorney—Young & Thompson

ABSTRACT: A clipper for vegetation comprises a pair of discs having outwardly extending teeth that are slidably juxtaposed. The discs are flat and of the same size and oscillate relative to each other in opposite directions about a common axis and in sliding contact with each other. A drive shaft coaxial with the discs penetrates the discs and carries a crank that drives an arm to which two links are pinned, one of the links being pivotally connected to one of the discs and the other of the links carrying a pin that rides in an arcuate slot through that one disc and is pivotally connected to the other disc.

PATENTED JAN 4 1972 3,631,658

INVENTOR
BURTON M. GREEN

BY Young & Thompson
ATTORNEYS

DOUBLE DISC CLIPPER

The present invention relates to double-disc clippers, more particularly of the type in which two discs have outwardly extending teeth and move relative to each other to perform a multiplicity of scissors or like cutting operations between the teeth of the discs. The clipper of the present invention is of the agricultural type, for clipping vegetation, and is particularly useful for trimming bushes and lawns and performing such other accurate tasks as cannot readily be performed by lawn mowers and the like.

This invention is an improvement on the invention of my earlier U.S. Pat. No. 3,472,007, which issued Oct. 14, 1969. The present invention is useful in the overall environment of that earlier patent, to which reference is made for a more complete disclosure thereof. Accordingly, the present application will disclose only those portions of the present clipper that are different from corresponding portions of my earlier clipper.

An object of the present invention is the provision of a double-disc power clipper, in which neither of the discs rotates rapidly and the danger to the operator and damage to the soil and vegetation are accordingly at a minimum.

Another object of the present invention is the provision of a double-disc clipper, in which the relatively moving parts are well balanced for smooth operation at relatively high speeds.

Finally, it is an object of the present invention to provide a double-disc clipper which will be relatively simple and inexpensive to manufacture, easy to operate, maintain and repair, and rugged and durable in use.

Other objects and advantages of the present invention will become apparent from a consideration of the following description, taken in connection with the accompanying drawing, in which.

Figure 1:
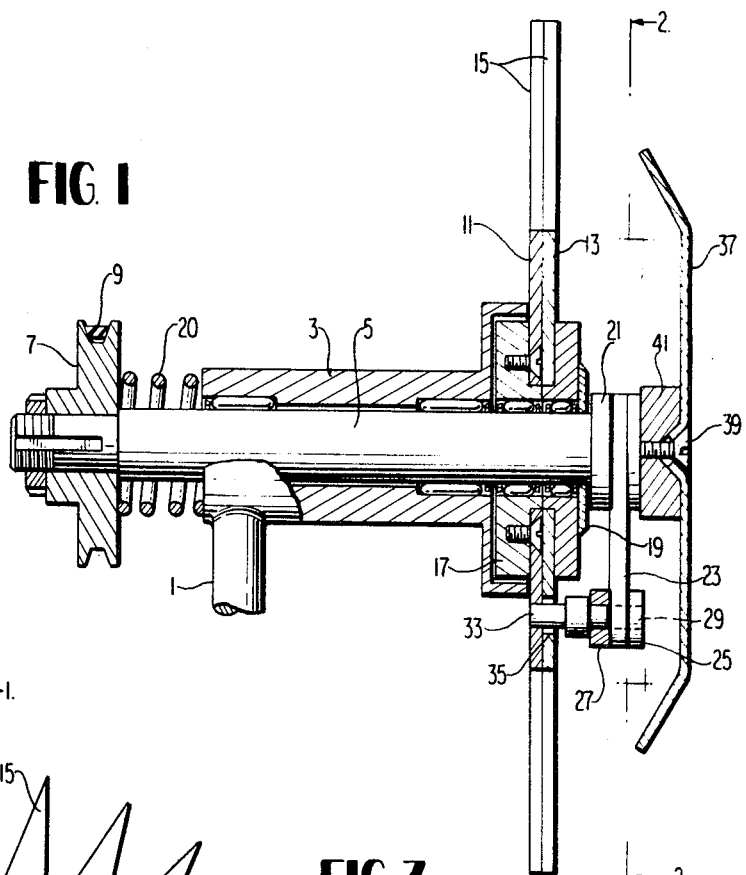
FIG. 1 is a cross-sectional view of the head of a clipper according to the present invention taken on the line 1—1 of FIG. 2.

Referring now to the drawing in greater detail, and first to FIG. 1, there is shown a clipper according to the present invention, in the form of a power clipper driven by a power source (not shown), comprising a forwardly extending shank 1 which may be mechanically mounted by which the clipper of the present invention is moved and positioned. At its forward end, shank 1 terminates in a hollow cylindrical sleeve 3 at right angles thereto. Sleeve 3 extends a substantial distance laterally outwardly of the forward end of shank 1 and internally carries a coaxial shaft 5 which is rotatable relative to sleeve 3 in roller bearings. At its innermost end, shaft 5 fixedly carries a pulley 7 over which is trained a belt 9 driven by a power source (not shown) to operate the clipper.

At its end opposite pulley 7, shaft 5 carries a pair of clipper discs 11 and 13 that are mounted coaxially for oscillation thereon while shaft 5 rotates within them, by means of roller bearings. Discs 11 and 13 are both flat and are in slidable contact with each other over their confronting faces. Each of discs 11 and 13 has a plurality of generally radially outwardly extending sharpened and tapered clipper teeth 15 that have cutting edges along both sides thereof.

Disc 11 is secured to an annular brake drum 17 which is freely rotatable relative to shaft 5. Drum 17 is provided with a selectively engageable brakeshoe (not shown) which may be selectively applied and released by an appropriate brake-actuating mechanism as in my earlier patent, for the purposes there disclosed.

An annular retaining washer 19 is fixedly secured to shaft 5 and bears against the right-hand side of disc 13 as seen in FIG. 1. Discs 11 and 13 have limited axial sliding movement on and relative to shaft 5, so that if vegetation becomes lodged between them, they can move apart so as to be self-cleaning and so as not to become clogged or jammed and broken. To this end, as also in my earlier patent, a coil compression spring 20 acts between pulley 7 and the end of sleeve 3 remote from the clipper discs, to urge shaft 5 to the left as seen in FIG. 1 thereby yieldably to urge washer 19 against disc 13 to urge discs 11 and 13 resiliently separably together.

At its end remote from pulley 7, shaft 5 carries a crank 21 fixedly secured thereto, to which is pivotally connected a crank arm 23. At its end remote from crank 21, arm 23 is pivotally interconnected to adjacent ends of a pair of links 25 and 27, by means of a pivotal connection 29. Link 25 at its other end is pivotally connected to the disc 13 by means of a pivotal connection 31; while at its end remote from pivotal connection 29, link 27 is pivotally interconnected to disc 11 by means of a pin 33. An arcuate slot 35 is coaxial with and extends through disc 13, and pin 33 rides in slot 35 so as not to interfere with disc 13.

There is sufficient play in the connections between the arm 23, the links 25 and 27 and the discs 11 and 13 that movement of these discs a short distance apart from each other, for the purpose of cleaning themselves of vegetation that would otherwise be stuck between them is facilitated.

Endwise outwardly, that is, at the right side as seen in FIG. 1, the assembly is closed by a protective cap 37 which is dished sheet metal and which is secured by a screw 39 coaxially of shaft 5, to an eccentric counterweight 41 disposed between cap 37 and the adjacent end of shaft 5 and secured to the outer side of crank 21 by means of fasteners 43. Counterweight 41 is eccentric in the direction of generally opposite crank 21, so that the rotating mass of crank 21 and the associated portions of arm 23 will be dynamically balanced.

Figure 2:
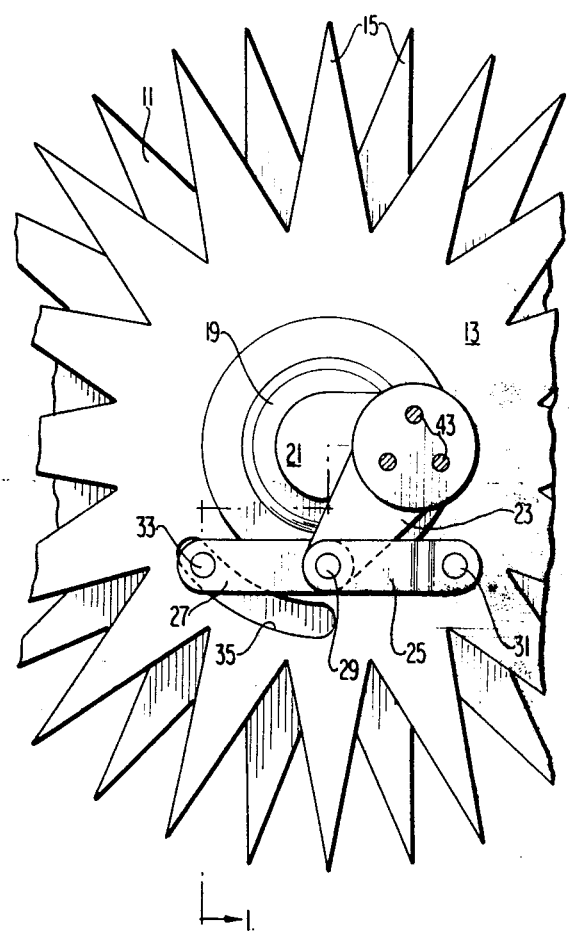
FIG. 2 is a view partly in cross section, taken on the line 2—2 of FIG. 1.
Figure 3:
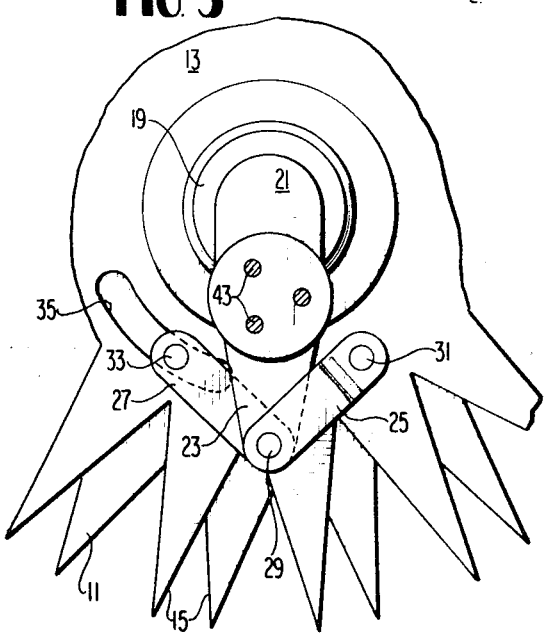
FIG. 3 is a fragment of FIG. 2, showing the parts in a different position.

In operation, when the shaft 5 is driven in rotation, the crank 21 will cause the end of arm 23 to which it is connected to follow a circular path. The other end of arm 23, at connection 29, will thus tend to oscillate, moving the links 25 and 27 between the positions shown in FIGS. 2 and 3, and beyond that of FIG. 3. The discs 11 and 13 will thus be oscillated relative to each other at high speed but will not rotate at high speed.

At the same time, it will be recognized that the discs 11 and 13 are free to rotate on shaft 5, so that the teeth 15 and "walk" on the ground. In other words, the discs 11 and 13, while oscillating rapidly relative to each other, can rotate with a peripheral speed that is the same as the speed of advance of the clipper. In this way, when the clipper is used, for example, for lawn edging, there is very little relative movement between an individual teeth 15 and the ground, with the result that the ground does not tend to become scored or gouged by the clipper. If the discs 11 and 13 were not thus able to roll along the ground, then they could dig an undesirable trench. Of course the brakeshoe that acts on drum 17 will be released at this time. On the other hand, if the discs become fouled, then application of the brake to drum 17 can prevent them from rotating rapidly with shaft 5, as also in my earlier patent identified above.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of this invention, as those skilled in this art will readily understand. Such modifications and variations are considered to be within the purview and scope of the present invention as defined by the appended claims.

I claim:

1. A clipper comprising a pair of discs having outwardly extending clipper teeth thereon that slide against one another to clip vegetation, the discs having substantially the same diameter, a drive shaft coaxial with the discs and rotatable relative to the discs and on which the discs are mounted, and means interconnecting the drive shaft and the discs to oscillate the discs relative to each other while restraining the discs against free rotation relative to each other.

2. A clipper as claimed in claim 1, said oscillating means comprising a crank carried by and eccentric to said drive shaft, an arm pivotally connected to said crank, and link means interconnecting said arm and said discs.

3. A clipper as claimed in claim 2, said link means comprising a first link pivotally connected at one end to said arm and at the other end to one of said discs, a second link pivotally connected at one end to said arm and at the other end to the other of said discs by a pin passing through a slot in said one disc.

4. A clipper as claimed in claim 1, said discs being flat and in sliding contact with each other over substantially all of their adjacent surfaces.

* * * * *